United States Patent [19]
Sato et al.

[11] 3,760,031
[45] Sept. 18, 1973

[54] ADHESIVE COMPOSITIONS FROM EPOXIDE AND ETHYLENE VINYL ACETATE COPOLYMER HAVING UNSATURATED CARBOXYLIC ACID GRAFTED THERETO

[75] Inventors: Koichi Sato; Akira Niki, both of Osaka; Hiroshi Kitamura, Yasu-gun; Masanobu Morimoto, Osaka, all of Japan

[73] Assignee: Asahi Kasei Kogyo Kabushiki Kaisha, Osaka, Japan

[22] Filed: Jan. 14, 1972

[21] Appl. No.: 217,967

Related U.S. Application Data
[63] Continuation-in-part of Ser. No. 47,564, June 18, 1970, abandoned.

[30] Foreign Application Priority Data
June 20, 1969   Japan................................ 44/48821

[52] U.S. Cl.......... 260/836, 117/123 D, 117/132 B, 117/132 BE, 117/132 H, 117/138.8 R, 117/138.8 N, 117/138.8 PV, 117/138.8 UA, 117/138.8 A, 117/138.8 E, 260/78.4 D, 260/836
[51] Int. Cl............................................. C08g 45/04
[58] Field of Search............................ 260/836, 837

[56] References Cited
UNITED STATES PATENTS
| | | | |
|---|---|---|---|
| 3,542,902 | 11/1970 | Dunion | 260/837 |
| 2,884,339 | 4/1959 | Dannenberg | 260/837 |
| 3,297,784 | 1/1967 | Snedeker | 260/837 |

*Primary Examiner*—Paul Lieberman
*Attorney*—Flynn & Frishauf

[57]   ABSTRACT

Adhesive compositions for effecting adhesion between an ethylene-vinyl acetate copolymer and a solid material comprising (A) a grafted product obtained by reacting an ethylene-vinyl acetate copolymer or a derivative thereof with a carboxylic acid or its anhydride having a conjugated double bond in the molecule and (B) a compound having epoxide group.

6 Claims, No Drawings

ADHESIVE COMPOSITIONS FROM EPOXIDE AND ETHYLENE VINYL ACETATE COPOLYMER HAVING UNSATURATED CARBOXYLIC ACID GRAFTED THERETO

This is a continuation-in-part application of U.S. Pat. application Ser. No. 47,564 filed June 18, 1970 now abandoned.

BACKGROUND OF THE INVENTION

1. Field of the Invention

This invention relates to adhesive compositions comprising (A) a graft copolymer obtained by reacting an ethylene-vinyl acetate copolymer (hereinafter referred to as EVA) or a derivative thereof with a carboxylic acid or its anhydride having a conjugated double bond and (B) a compound having epoxide group as active ingredients.

2. Description of the Prior Art

EVA is a hot-melt adhesive most widely used nowadays, which is used as a base polymer of adhesive compositions for a wide variety of adherents including paper, wood, fibers, metals and plastics including polyolefins. EVA adhesives containing rosin, indene, paraffin, wax or the like are especially suitable for book-binding or bag-making, lacquer- or wax-finishing of paper or adhering a plastic film to a paper. However, as EVA has no inherent functional group capable of effecting adhesion though being polar due to its ester group, it is difficult to effect satisfactory adhesion by the use of EVA as it is as an adhesive or a coating material. EVA containing a larger portion of vinyl acetate, which is sufficiently tacky to be easily adhered as compared with EVA containing vinyl acetate as little as several percent, does not produce a satisfactorily high degree of adhesion because of the decrease in cohesive force. Furthermore, adhesion between EVA containing a smaller portion of vinyl acetate and an adherent is defective in creep resistance, water-proofness, heat resistance, solvent-proofness and degree of adhesion over a long period of time, because, even if EVA containing a larger portion of vinyl acetate is used as the adhesive, there is formed neither chemical bond with the adherent nor cross-linkage between molecules of the adhesive.

SUMMARY OF THE INVENTION

With the object of producing firm adhesion between an EVA coating material and an adherent solid material, as well as improving the durability of the adhesion strength or peeling strength, we have made extensive investigations to find adhesives capable of effecting far firmer and more durable adhesion as compared with the prior art adhesives of the EVA family.

It is an object of this invention to provide adhesive compositions comprising as the main ingredients (A) a grafted product of EVA or a derivative thereof with a carboxylic acid or its anhydride having a conjugated double bond as specified hereinbelow (grafted EVA) and (B) a compound having epoxide group. Other objects will be apparent hereinafter.

The grafted EVA is provided with polarity due to the presence of ester groups as well as with functionality due to the presence of carboxyl groups, and thus being capable of effecting firm adhesion between the adherent and the EVA coating material.

We have now found that an adhesive composition containing, in addition to the grafted EVA, a compound having epoxide group leads to a great improvement of adhesion strength of the above-mentioned adhesive composition. According to the present invention, the adhesive composition containing as the main ingredients the grafted EVA and a compound having epoxy group, when applied to the surface of adherent prior to adhering an EVA coating material with an adherent, enables far firmer adhesion between the EVA and the adherent.

"EVA and derivatives thereof" which are grafted with a carboxylic acid or its anhydride having a conjugated double bond include ethylene-vinyl acetate copolymers having a density from 0.93 to 0.99, a vinyl-acetate content from two to 70% by weight and a melt index according to ASTM TM-D-1238 (revised) from 2 to 150 g./10 min. and chlorinated, chlorosulfonated or sulfonated products of said ethylene-vinyl acetate copolymers, for example, chlorinated EVA containing chlorine from five to 30% by weight and chlorosulfonated EVA containing chlorine from one to 40% by weight and sulfur from 0.05 to 7% by weight.

The grafted EVA or derivative thereof is obtained by subjecting EVA or a derivative thereof to a reaction with a carboxylic acid or its anhydride having a conjugated double bond as specified hereinbelow. In practice, the reaction is carried out in a solution of an appropriate solvent. As the solvent an aliphatic or aromatic hydrocarbon, a chlorinated hydrocarbon or the like may be well utilized. Examples of suitable solvent include xylene, toluene, trichlorethylene and carbon tetrachloride. Most preferred is xylene in view of radical chain transfer to the solvent, boiling point and reactivity.

In carrying out the reaction, EVA or a derivative thereof is dissolved in the above-cited solvent at ordinary temperature or by heating, followed by addition of a carboxylic acid of its anhydride having a conjugated double bond as specified hereinbelow. After forming a homogeneous solution or dispersion, followed by deoxygenation, the homogeneous phase is heated to a temperature from 70° to 130° C., to which a peroxide dissolved in an appropriate solvent is added dropwise. It is important in the above procedure to add a carboxylic acid or its anhydride having a conjugated double bond and a peroxide separately. Suitable proportions of the reagents are from five to 30 parts by weight of a carboxylic acid or its anhydride having a conjugated double bond, from 0.5 to 10 parts by weight of a peroxide and from 200 to 500 parts by weight of a solvent per 100 parts by weight of EVA or a derivative thereof. Exemplary peroxide include benzoyl peroxide, dibenzoyl peroxide, dicumyl peroxide and the like and benzoyl peroxide is especially effective. A reaction time from 1 to 3 hours is sufficient for the reaction. Passing an inert gas through the reaction system is considered to be desirable for the reaction time as well as in effect. Infrared absorption spectrum of the reaction product purified by means of acetone reprecipitation indicates the presence of carbonyl groups, which demonstrates the formation of a graft compound.

Choice of the EVA in the present invention depends upon the object to be achieved and preferred content of vinyl acetate is from two to 70% by weight of the EVA. The derivatives illustrated above, for example, are obtained by subjecting EVA to chlorination or chlorosulfonation by dissolving EVA in carbon tetrachloride followed by addition of a small amount of titanium oxide and then introducing dry chlorine gas or simultaneously chlorine gas and sulfur dioxide gas into the mixture while heating at 70°–100° C. with vigorous stirring. Then, from the bottom of the reaction vessel is continuously introduced running water with slow stirring to wash off the hydrochloride, sulfuric acid or the like formed, immediately followed by steam distillation to recover the solvent. There is obtained a solid chlorinated or chlorosulfonated product of EVA. However, utility of this invention will be independent of the particular process of producing the derivative.

The specific compounds with a double bond conjugated with a carbonyl group according to the present invention include maleic acid, maleic anhydride and acrylic acid and especially effective are maleic acid and maleic anhydride. The above-cited compound in an amount from five to 30 parts by weight per 100 parts by weight of the starting EVA polymer is sufficient for the reaction. The grafted EVA per se is so chemically stable that it has no tendency at all to be decomposed or reacted with elapse of time.

The compounds having epoxide group which may be used in the present invention are those having at least two ethylene oxide-type three-membered rings per molecule and a molecular weight of less than 5,000, including, for example, epichlorohydrin derivatives of bisphenol A, epichlorohydrin derivatives of pentaerythritol, vinylcyclohexane dioxide, butadiene oxide and divinyl benzene dioxides.

Incorporation of the compound with epoxide group leads to formation of the desired cross linking bonds between the adhesive molecules or between the adhesive and the adherent solid material. When an adhesive composition comprising the grafted EVA alone is used, the adherent may be pretreated with the above-described compounds having epoxide. However, the pretreatment leads to multi-step adhesion process which is less advantageous.

The incorporated amount of the compounds with epoxide group is suitably from 0.1 to 10 parts by weight per 100 parts by weight of the grafted EVA. Incorporation in amounts more than the above-cited is disadvantageous because of reduction in stability of the grafted EVA in practical use.

The adhesive composition of this invention may be either in the form of a mixed solution of the grafted EVA and a compound having epoxide group or in the form of powder, film, flake or granule obtained by regenerating and coagulating the grafted EVA from the mixed solution of the grafted EVA and a compound having epoxide group with a solvent such as acetone or methanol. To the solution of grafted EVA obtained by graft reaction may be added a compound having epoxide group and a desired amount of solvent and the resulting diluted solution may be used as it is. The presence of the unreacted starting material mixed with the reaction product does not adversely affect the adhesion strength or peeling strength. The grafted product is employed at a concentration of 10% or lower.

Procedures of producing adhesion between EVA coating material and an adherent by use of the adhesive composition of this invention will be described below. The adhesive composition may be appropriately used either in solid or in solution as described above. When the adhesive is used in solution, a solution of the adhesive composition of the invention is applied to the surface of an adherent, or an adherent is dipped in said solution followed by evaporation to remove the solvent. When used in film, powder or the like, the adhesive composition of the invention is uniformly contacted with or dusted on the adherent followed by application of heat (80°–200° C.) and pressure. The adhesive composition is then melted, thereby being fluidized to form a film upon the surface of the adherent. The applied amount of the adhesive composition is preferably from 0.5 to 30 g./m.$^2$ of the area to be adhered. Adhesion is completed by layering an EVA sheet or film over the adherent pretreated with the adhesive composition of this invention followed by hot-pressing or by applying thereto a solution or melt of EVA. The coated material from the adhesion thus produced involves firm adhesion of EVA to the adherent, which is also excellent in durability. As described above, interposition of the adhesive composition of this invention between EVA and an adherent is effective in producing excellent adhesion between the two.

"Adherent" referred to herein are polar and non-polar solid materials including metals, fibrous materials, wood, molded products of thermosetting resins, for example, phenol resin, urea-formalin resin and melamine resin, molded products of thermoplastic polymers, for example, polyethylene, polypropylene, polyamide, polyvinyl chloride, polystyrene, polyvinyl alcohol and polyacrylonitrile, diene rubbers, for example, natural rubber, butyl rubber, chloroprene rubber, butadiene rubber, SBR, NBR and similar products, and other materials such as ceramic ware, glass and concrete. Any shape of the materials may be employed such as film, sheet, cloth or cylinder. As described above, it is possible to provide a variety of EVA-coated products by the use of the adhesive composition according to the present invention for producing firm and durable adhesion between a wide variety of solid materials and EVA.

DESCRIPTION OF PREFERRED EMBODIMENTS

The examples which follow are submitted to illustrate and not to limit this invention, in which parts are by weight.

COMPARATIVE EXAMPLE 1

100 parts of EVA containing 25% by weight of vinyl acetate and having a softening point of 188° C. measured by ring and ball method, a density of 0.95 g./cm.$^3$ and a melt index of 2, were added with 20 parts of maleic anhydride and 350 parts of m-xylene and dissolved at 120° C. with stirring to give a solution. To the resulting solution was added dropwise a solution of 2 parts of benzoyl peroxide dissolved in 50 parts of m-xylene, followed by reaction for 2 hours. The reaction mixture was poured into acetone to precipitate the grafted EVA. The resulting polymer was regenerated by drying at 50° C. for 3 hours, softening point 180° C. measured by ring and ball method. Analysis of the regenerated polymer by infrared absorption spectrum distinctly indicated characteristic peaks for maleic anhydride at 1,785 cm.$^{-1}$ and 1,860 cm.$^{-1}$ The regenerated polymer was extruded at 80° C. by means of a two roll mill to a film of 0.1 mm. thickness. By the use of the film thus obtained was made adhesion between EVA containing 25% by weight of vinyl acetate and polyethylene films in such a way as set forth below. On a polyethylene film 0.5 mm. in thickness and 30×30 mm. in size were overlaid a film of the graft copolymer prepared above and further a film of the EVA above-mentioned having a thickness of 0.5 mm. and a size of 30×30 mm., and the resulting assembly was adhered together by hot-pressing at 150° C. under a pressure of 1 kg/cm.$^2$ for 60 seconds. Whereas an adhesive strength was 0.5 kg./25 mm. width with a test piece 25 mm. wide and 200 mm. long produced by direct adhesion between EVA and polyethylene film made under the same conditions as above, when peeled at a tension velocity of 20 cm./min., the use of the adhesive composition of this invention produced an adhesive strength of 17 kg./25 mm. width.

COMPARATIVE EXAMPLE 2

Adhesion was made between an EVA film of a vinyl acetate content of 15% and an iron plate using a 5% toluene solution of the same regenerated graft copolymer as in Comparative Example 1 as the adhesive. The surface of an iron plate was thoroughly rinsed with benzene and applied with the above-mentioned adhesive, followed by air drying. The EVA film was placed on the treated surface of the iron plate and hot-pressed at a temperature of 150° C. under a pressure of 1 kg./cm.$^2$ for 120 seconds. Shear strength per 10×10 mm.$^2$ was 0.2 kg. with the untreated product, whereas it was 8.4 kg. with the treated one.

EXAMPLE 1

Reaction products obtained by reacting 20 parts of maleic anhydride with 100 parts of EVA having various contents of vinyl acetate in the same way as in Comparative Example 1 were diluted respectively with a 1:1 mixed solvent by volume of xylene and toluene to give a solution each having a solid content of three percent. To 100 parts of the diluted solution were added 0.5 parts of an epoxy resin (Trade mark EPIKOTE 1004, manufactured by Shell Chemical) having an epoxy equivalent of 450–500 and a molecular weight of 500 to prepare a solution for adhesion treatment. Scored plain nylon cloths of 840 d. filaments having a density of 38×25/in. were dipped in the above-mentioned solution for adhesion treatment, followed by squeezing to a pick up of 40 percent and drying at 130° C. for 10 minutes. On the resulting cloths after the adhesion treatment were respectively placed the EVA films having various vinyl-acetate contents, followed by hot-pressing at a temperature of 150° C. under a pressure of 2 kg./cm.$^2$ for 60 seconds to prepare a coated cloth. Separately, melted EVA without the graft reaction product was applied to one side of the nylon cloth to a coating in an amount of about 5 g./m.$^2$, followed by hot-pressing in the same way as above to prepare a coated cloth. Comparison was made with the product prepared with the grafted EVA adhesive composition of this invention for peeling strength. The results are shown in the following table:

EXAMPLE 2

Using an adhesive with 1 part of an epoxy resin (Trade mark EPIKOTE 828, manufactured by Shell Chemical) having an epoxy equivalent of 180–190 and a molecular weight of 355 added to 100 parts of the adhesive prepared in Comparative Example 2, test were made in the same way as in Comparative Example 2.

| Adherent | Shear strength kg./10×10mm.$^2$ Control (untreated) | Shear strength kg./10×10mm.$^2$ By the method of the invention |
|---|---|---|
| Veneer board | 0 | 21 |
| Tin plate | 7 | 21 |
| Melamine-decorated plate | 0 | 13 |
| Slate | 1.3 | 5.5 |

EXAMPLE 3

The grafted EVA was prepared according to the same procedures as described in the Comparative Example 1 except that EVAs having vinyl acetate contents of 8.25 and 40% were used.

The resultant dried grafted EVAs were dissolved into m-xylene to form solutions having the concentrations of the respective grafted EVAs of 5% by weight.

To the solutions of the grafted EVAs were added one part by weight of epoxy resin (EPIKOTE 1004 manufactured by Shell Chemical) per 100 parts by weight the solutions, respectively, to produce adhesive compositions.

Plain weave of 6-nylon of 840 d. were dipped in the above-mentioned solutions, followed by squeezing to a wet pick up of 45 percent and drying at 160° C. for 3 minutes. On the resulting cloths were respectively placed the EVA films having a vinyl acetate content of 25 percent and a thickness of 1.5 mm., followed by hot-pressing at a temperature of 160° C. under a pressure of 1.5 kg./cm.$^2$ for 45 seconds to prepare coated cloths. The peeling strengths between the coated cloths and the EVA films are shown in the following table with the results obtained from the adhesive composition containing no epoxy resin.

| Vinyl acetate content of the grafted EVA (%) | Peeling Strength (kg./25mm. width) Grafted EVA containing no epoxy resin | Grafted EVA containing epoxy resin |
|---|---|---|
| 8 | 3.0 | 6.5 |
| 25 | 4.1 | 8.8 |
| 40 | 1.0 | 3.0 |

EXAMPLE 4

100 parts of EVA containing 25% by weight of vinyl acetate and having a density of 0.95 g./cm.$^3$, and a melt index of 2.0 were dissolved in 300 parts of carbon tetrachloride to give a solution. To the resulting solution was added 0.5 parts of titanium oxide. The mixture was chlorinated by introducing dry chlorine gas at 80° C. with vigorous stirring at a gas flow velocity of 15 liters

| Vinyl acetate content of the grafted EVA (percent) | Vinyl acetate content of the EVA used as the coating material (percent) | | | | | |
|---|---|---|---|---|---|---|
| | 8 | | 15 | | 25 | |
| | Peeling strength (kg./25 mm. width) | | | | | |
| | Blank | Process of this invention | Blank | Process of this invention | Blank | Process of this invention |
| 15 | 0.3 | 4.5 | 0.6 | 6.3 | 0.3 | 7.3 |
| 25 | 0.4 | 4.3 | 0.5 | 6.5 | 0.9 | 9.3 |
| 28 | 0.6 | 3.0 | 0.7 | 4.5 | 0.6 | 8.5 |
| 40 | 0.5 | 1.9 | 0.8 | 2.0 | 1.0 | 2.6 | per hour for 5 hours. The resulting product was poured into water to precipitate the chlorinated EVA. The chlorinated EVA was washed with water to remove chlorine. The chlorine content of the chlorinated EVA was 29.5% by weight.

Example 3 was repeated except that the chlorinated EVA obtained above was used. The results are shown in the following table.

|  | Chlorine content (%) | Peeling Strength (kg./25mm.width) | |
|---|---|---|---|
|  |  | Grafted EVA containing no epoxy resin | Grafted EVA containing epoxy resin |
| Sample 1 | 30.6 | 5.2 | 6.2 |
| Sample 2 | 16.8 | 4.8 | 5.8 |

EXAMPLE 5

To a solution of 100 parts of EVA containing 25% of vinyl acetate and having a density of 0.95/cm.$^3$ and a melt index of 2.0 dissolved by heating in 300 parts of carbon tetrachloride were added 0.5 parts of titanium oxide. Chlorosulfonation was made by introducing with vigorous stirring into the solution a mixture consisting of 1 part by volume of dry chlorine gas and 2 parts by volume of sulfur dioxide gas at a gas flow velocity of 10 liters per hour for 6 hours at 80° C. Running water was then introduced from the bottom of the vessel to remove the hydrogen chloride and sulfuric acid and the resulting mass was dried to prepare a chlorosulfonated EVA. Chlorine and sulfur contents of the dried products were 17.2% and 3.7% respectively. The reaction product of 100 parts of the chlorosulfonated EVA grafted with 15 parts of maleic acid by the same method as in Comparative Example 1 was diluted to a solution having a solid concentration of 7%. A solution for adhesion treatment was prepared respectively by incorporating 2 parts of an epoxy resin (EPIKOTE 815, epoxy equivalent 180–200, molecular weight 350, manufactured by Shell Chemical) into 100 parts of the resulting solution.

Scored plain fabrics made of polyester 1260 d. filaments of a density of 30×30/in. were dipped in the above-mentioned solution for adhesion treatment, followed by squeezing of the solution to a pick-up of 40%. The treated cloth, after dried at 150° C. for 10 minutes, was coated with an EVA having vinyl-acetate content of 25% to prepare a coated cloth. Comparison was made on water proof, heat resistance and solvent resistance with respect to the peeling strength among the resulting cloths.

EXAMPLE 6

Example 3 was repeated except that the chlorosulfonated EVA prepared according to the procedures described in the preceding EXAMPLE 5 was used.
The results are shown in the following table.

|  | Chlorine content (%) | Sulfur content (%) | Peeling Strength (kg./25mm.width) | |
|---|---|---|---|---|
|  |  |  | Grafted EVA containing no epoxy resin | Grafted EVA containing epoxy resin |
| Sample 1 | 17.2 | 3.7 | 5.5 | 7.2 |
| Sample 2 | 10.5 | 1.2 | 4.8 | 8.1 |

What we claim is:

1. Adhesive compositions comprising (A) a grafted product obtained by reacting an ethylene-vinyl acetate copolymer or a derivative thereof with from five to 30 parts by weight per 100 parts by weight of said copolymer or derivative thereof, of a carboxylic acid or its anhydride having a double bond conjugated with a carbonyl group in the molecule, said ethylene-vinyl acetate copolymer containing from two to 70 percent by weight of vinyl acetate and (B) from 0.1 to 10 parts by weight per 100 parts by weight of said copolymer or derivative thereof of a compound having an epoxide group and having at least two ethylene-oxide type three-membered rings per molecule and a molecular weight of less than 5,000.

2. Adhesive compositions according to claim 1 wherein said carboxylic acid or its anhydride having a conjugated double bond is selected from the group consisting of maleic acid, maleic anhydride and acrylic acid.

3. Adhesive compositions according to claim 1 wherein said derivative of ethylene-vinyl acetate copolymer is selected from chlorinated, chlorosulfonated and sulfonated ethylene-vinyl acetate copolymers.

4. Adhesive compositions according to claim 1 wherein said compound having an epoxide group is selected from the group consisting of epichlorohydrin derivatives of bis-phenol A, epichlorohydrin derivatives of pentaerythritol, vinyl cyclohexane dioxide, butadiene oxide and divinyl benzene dioxides.

5. Adhesive compositions according to claim 1, wherein said carboxylic acid is maleic acid.

6. Adhesive compositions according to claim 1, wherein said carboxylic acid is maleic anhydride.

* * * * *

| Solution of adhesion treatment | (1) Normal (kg./25 mm. width) | (2) Water proof (kg./25 mm. width) | (3) Heat resistance (kg./25 mm. width) | (4) Solvent resistance (kg./25 mm. width) |
|---|---|---|---|---|
| EVA alone, 5% solution | 1.6 | 0.3 | 0.2 | 0 |
| EVA 5% solution and epoxy resin | 0.8 | 0.2 | 0.1 | 0.2 |
| Grafted copolymer, 5% solution | 5.5 | 2.0 | 2.0 | 0.4 |
| Grafted copolymer 5% solution and epoxy resin | 13.0 | 14.2 | 13.6 | 1.9 |

NOTE.—(1) Normal (20° C., Relative humdity 65%). (2) Measured after dipped in water for 24 hours. (3) Measured after dipped in boiling water for 1 hour. (4) Measured after dipped in toluene for 15 minutes.